Figure 1:
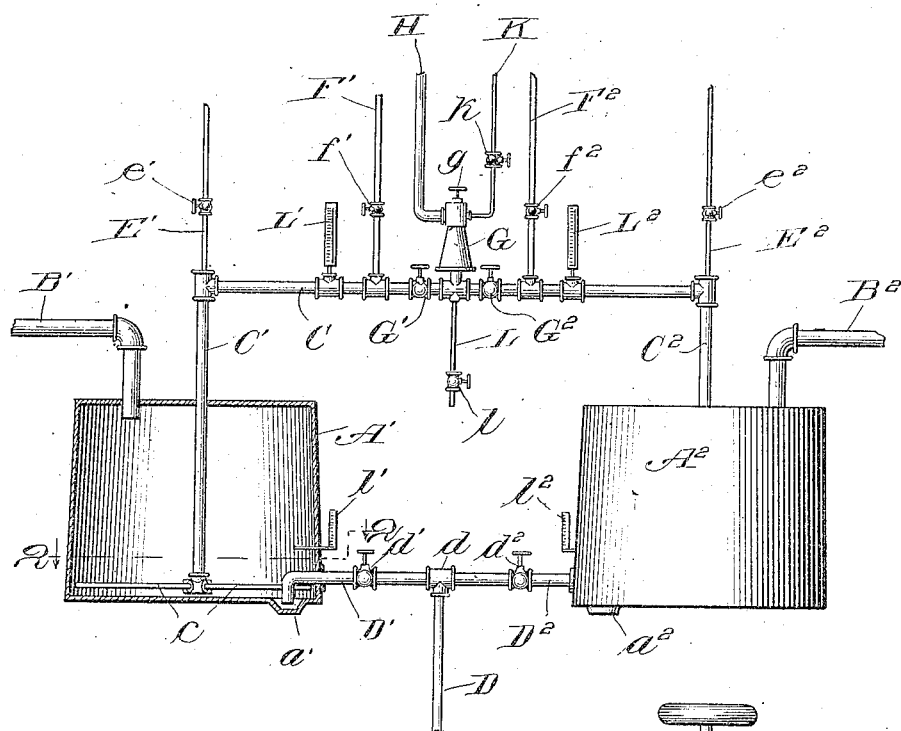

No. 881,104. PATENTED MAR. 10, 1908.
T. E. BREYER.
PROCESS OF MAKING THIN BOILING STARCH.
APPLICATION FILED APR. 19, 1905.

Witnesses:
H. L. Gaither
Geo. L. Goetz

Inventor:
Theodor E. Breyer
by Chamberlin & Wilkins
attys

UNITED STATES PATENT OFFICE.

THEODOR E. BREYER, OF WAUKEGAN, ILLINOIS.

PROCESS OF MAKING THIN BOILING STARCH.

No. 881,104.   Specification of Letters Patent.   Patented March 10, 1908.

Application filed April 14, 1905. Serial No. 256,391.

*To all whom it may concern:*

Be it known that I, THEODOR E. BREYER, a citizen of the United States, residing at Waukegan, county of Lake, State of Illinois, have invented a certain new and useful Improvement in Processes of Making Thin Boiling Starch, and declare the following to be a full, clear, and exact description of the same, such as will enable others skilled in the art to which it appertains to make and use the same, reference being had to the accompanying drawings, which form a part of this specification.

My invention relates in general to the manufacture of starch, and more particularly to a process for making thin boiling starch.

In the manufacture of thin boiling or modified starch by the action of dilute acid upon ordinary starch, the time required may be considerably shortened by heating the mixture to a point near, but always below the temperature at which the starch becomes pasty. It is, however, necessary that the starch milk should be continuously agitated while being heated in order that the starch may be kept in suspension. It is impossible to use steam as the medium for heating the starch milk owing to its temperature being too great, and it is also impracticable to employ heated air on account of the low heat capacity of gases.

The primary object of my invention is to provide a process of making thin boiling starch by the practice of which the starch milk may be heated to the requisite degree by discharging into the same the heating medium, the starch milk being thereby coincidently agitated so as to prevent the settling of the starch.

A further object of my invention is to provide a process for manufacturing thin boiling starch which will be economical and efficient in practice.

I have discovered that by discharging a mixture of steam and air into acidulated starch milk the proper degree of heat may be imparted thereto to promote the conversion thereof into thin boiling starch, while at the same time the starch milk will be so agitated by the heating medium that the starch will be kept in suspension.

My improved process therefore consists in discharging a mixture of steam and air into acidulated starch milk.

My invention further consists in the process of first discharging a mixture of steam and air into acidulated starch milk and subsequently after the desired temperature has been acquired discontinuing the discharge of mixed air and steam and discharging compressed air into the starch milk to prevent the settling of the starch.

My process may be carried out by any suitable apparatus such for instance as that illustrated in the accompanying drawings in which,—

Figure 2:
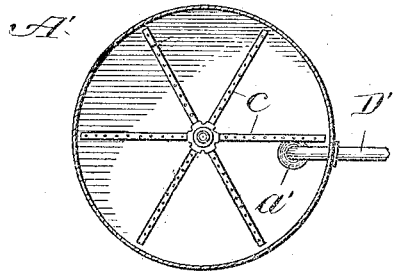
Figure 3:
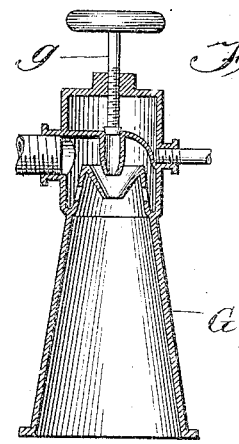

Figure 1 is an elevational view, one of the tanks being shown in vertical section; Fig. 2 a sectional view on line 2—2 Fig. 1; and Fig. 3 a detail sectional view of the steam jet.

The same reference characters are used to designate the same parts in the several figures of the drawing.

Reference character $A'$ and $A^2$ designate two tanks of any suitable size, shape, and construction. $B'$ and $B^2$ designate pipes leading into the tanks $A'$ and $A^2$ and through which the starch, which has been previously broken into a heavy starch milk, is pumped.

$C'$ and $C^2$ designate vertical conduits extending downwardly within the tanks $A'$ and $A^2$ and terminating at their lower ends in spiders, such as shown in Fig. 2, composed of one or more perforated pipes $c$. The upper ends of the conduits $C'$ $C^2$ are connected to the horizontal conduit $C$. A steam jet device G of any suitable construction communicates with the horizontal conduit $C$ preferably at a point intermediate of its ends.

K is a steam pipe leading to the jet device G and provided with a controlling valve $k$.

H designates an air inlet pipe which leads to the steam jet device G.

Leading downwardly from the horizontal conduit $C$ is a pipe L having a cut-off valve $l$ therein through which water of condensation may be discharged.

Located in the conduit C are valves $G'$ and $G^2$ the former of which is located between the steam jet device G and the conduit $C'$ while the latter is located between the steam jet device and the conduit $C^2$. $F'$ and $F^2$ designate vent pipes having controlling valve $f'$ and $f^2$ therein. The former of these vent pipes leads from the conduit C at a point intermediate of the valve $G'$ and the conduit $C'$, while the other of said vent pipes leads from a point in the conduit $C'$ between the valve $G^2$ and the conduit $C^2$.

$L'$ and $L^2$ designate thermometers located upon the conduit C intermediate of the points where the vent pipes F' and F² communicate with the conduit C, and C' and C² respectively.

E' and E² indicate pipes communicating with the upper ends of the conduit C' and C² respectively, such pipes being in communication with a source of compressed air. Valves e' and e² are provided in the pipes E' and E² for regulating the passageway therethrough.

D' and D² indicate conduits communicating with the interior of the tanks A' A² near the bottoms thereof and with which communicates a delivery conduit D through which the starch is pumped from the tanks and delivered to a filter press or similar device for removing the surplus water preparatory to drying the starch. Valves d' d² are provided in the conduits D' and D² for controlling the flow of starch from the respective tanks. The bottoms of the tanks are preferably provided with depressions a' a² into which the ends of the conduits D' D² extend thereby permitting the ends of the conduits to project below the bottoms of the tanks so that all of the starch may be drained from the tanks. Thermometers l' l² are preferably provided on the tanks A' A² to indicate the temperature of the starch.

The manner of using and operation of the above described apparatus are as follows: A heavy acidulated starch milk is pumped through the conduits B' B² into the tanks. The valve k is then turned so as to permit steam to pass through the pipe K into the steam jet device G where it is mixed with air drawn in through the inlet pipe H. The mixed air and steam then passes through the horizontal conduit C and conduit C' and C² to the bottoms of the tanks where it is discharged through the perforations in the tubes c communicating with the lower ends of the conduits. The mixed steam and air passing through the starch milk heats the same thereby promoting the conversion of the same into thin boiling or modified starch. The mixture of steam and air also serves to keep the starch in suspension thereby avoiding the necessity of providing mechanical stirring mechanism. The valve G' and G² permit either one or both of the tanks to be supplied with the mixed steam and air so that either tank alone may be used if desired. The valves f' f² are opened upon the first admission of steam and air to the conduit C so as to permit a portion of the mixture to escape and prevent the too rapid heating of the starch milk. By adjusting the position of the valves f' f² the temperature may be regulated by permitting a portion of the mixture to escape through the pipes F' F². The thermometers L' L² indicate the temperature of the mixture and serve as a guide for the regulation of the valves f' f².

As soon as the thermometers L' L² indicate that the starch milk has acquired the desired temperature the mixture of air and steam is shut off by closing the valves G' G². The valves e' e² are then opened admitting compressed air to the conduit C' C², which is discharged through the starch milk thereby preventing the settling of the starch. When the temperature of the starch milk in the tanks begins to fall the compressed air is shut off by closing the valves e' e² and the mixture of steam and air is again turned on by opening the valves G' G². When it is ascertained by testing that the starch has acquired the desired property, it is removed from the tanks through the conduits D', D² and D by opening the valves d' d².

From the foregoing description it will be observed that I have invented an improved process for manufacturing thin boiling starch by the practice of which the starch milk is heated to the desired degree and coincidently agitated by discharging the heating medium in the starch milk.

Having now fully described my invention, what I claim as new, and desire to secure by Letters Patent is:

The process of manufacturing thin boiling starch which consists in first discharging into acidulated starch milk a mixture of steam and air thereby imparting the requisite heat to the starch milk to promote the conversion thereof into thin boiling starch and coincidently keeping the starch in suspension, and subsequently after the desired temperature has been acquired discontinuing the discharge of the mixed air and steam and discharging compressed air into the starch milk to prevent the starch from settling.

In testimony whereof, I sign this specification in the presence of two witnesses.

THEODOR E. BREYER.

Witnesses:
 FRANK W. BRIDGES,
 JAS. S. FLOOD.